No. 830,790. PATENTED SEPT. 11, 1906.
C. L. KENNICOTT.
WATER PURIFYING APPARATUS.
APPLICATION FILED NOV. 6, 1905.

4 SHEETS—SHEET 1.

Witnesses:
Inventor:
Cass L. Kennicott,

No. 830,790. PATENTED SEPT. 11, 1906.
C. L. KENNICOTT.
WATER PURIFYING APPARATUS.
APPLICATION FILED NOV. 6, 1905.

4 SHEETS—SHEET 2.

Witnesses:
Cass E. Gaylord,
John Enders.

Inventor:
Cass L. Kennicott,
By Dyrenforth, Dyrenforth & Lee,
Attys.

No. 830,790. PATENTED SEPT. 11, 1906.
C. L. KENNICOTT.
WATER PURIFYING APPARATUS.
APPLICATION FILED NOV. 6, 1905.
4 SHEETS—SHEET 3.
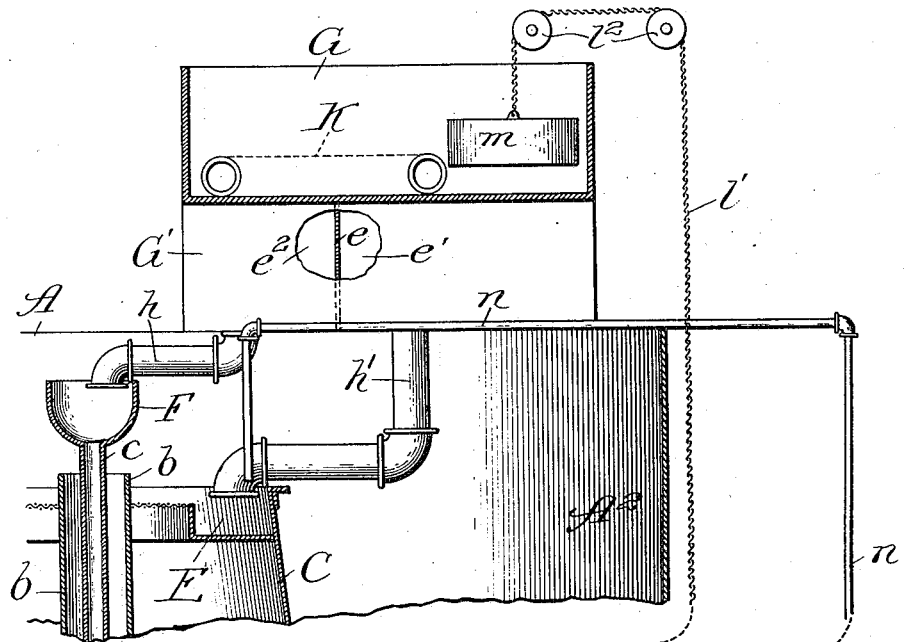
Fig. 3.
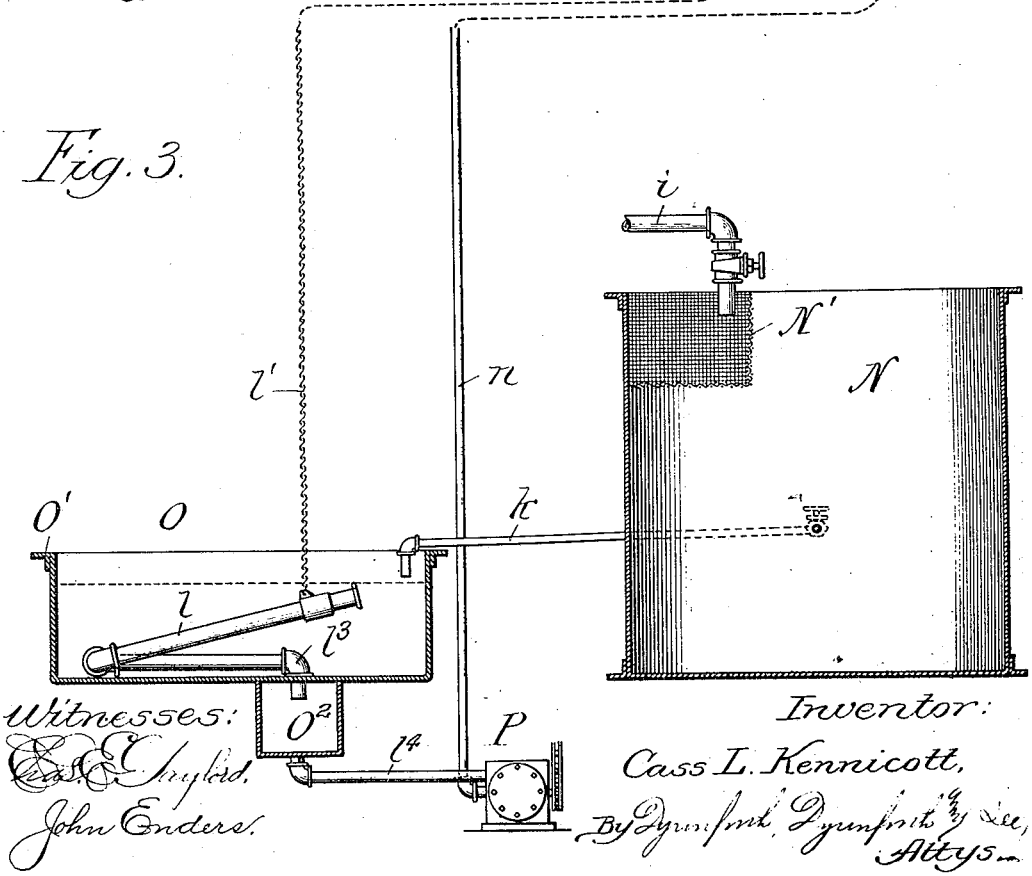
Witnesses:
Inventor:
Cass L. Kennicott,

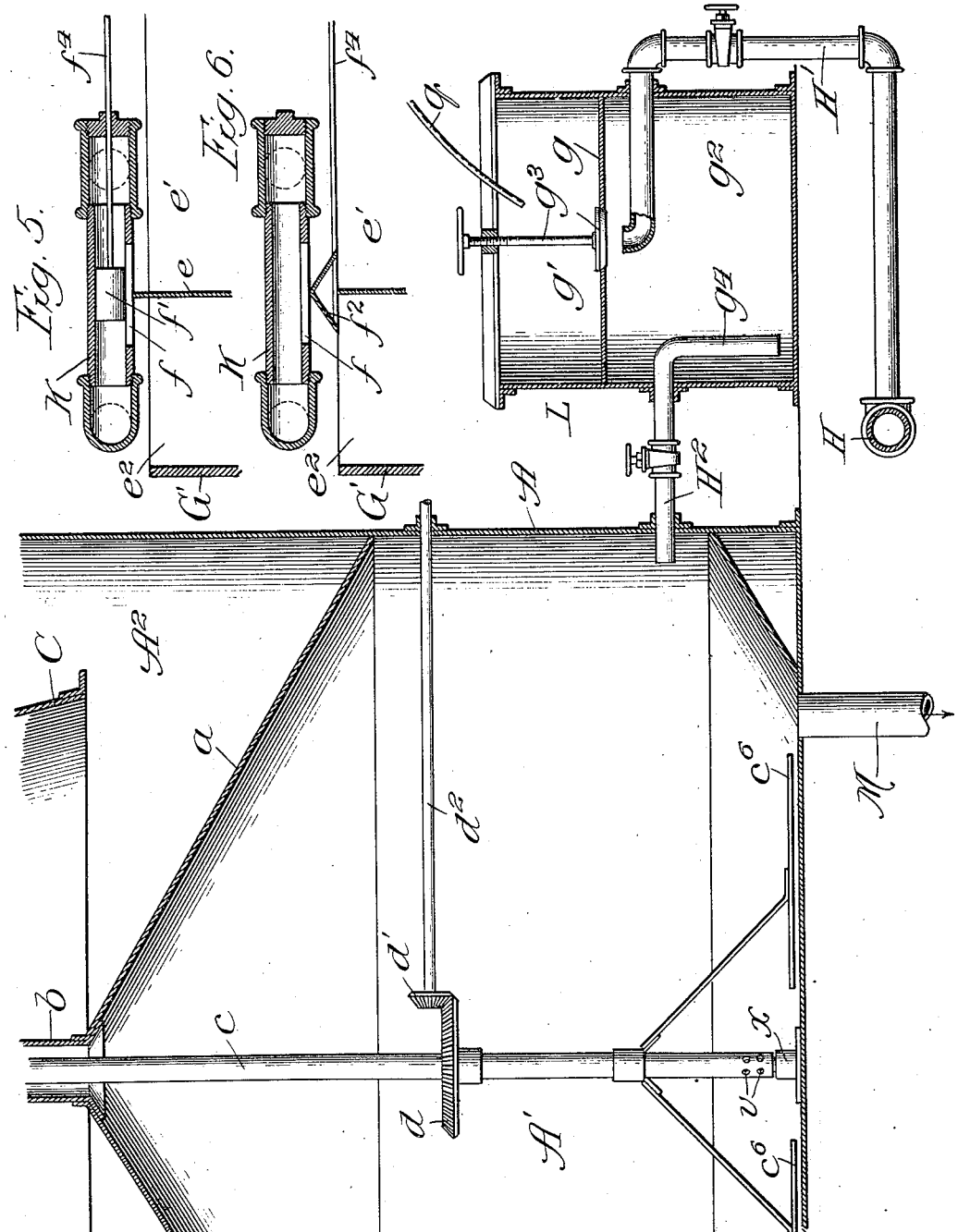

UNITED STATES PATENT OFFICE.

CASS L. KENNICOTT, OF CHICAGO, ILLINOIS, ASSIGNOR TO KENNICOTT WATER SOFTENER COMPANY, OF CHICAGO, ILLINOIS, A CORPORATION OF ILLINOIS.

WATER-PURIFYING APPARATUS.

No. 830,790.  Specification of Letters Patent.  Patented Sept. 11, 1906.

Application filed November 6, 1905. Serial No. 285,993.

*To all whom it may concern:*

Be it known that I, CASS L. KENNICOTT, a citizen of the United States, residing at Chicago, in the county of Cook and State of Illinois, have invented a new and useful Improvement in Water-Purifying Apparatus, of which the following is a specification.

My invention relates to improvements in water-softening apparatus of the class exemplified in Letters Patent of the United States No. 646,108, dated March 27, 1900; and it relates particularly to the construction and arrangement of parts of the apparatus involving the feed regulation of the chemicals employed in solution for treating the water to be purified.

The general object of my improvement is to adapt the apparatus to be operated and set from the ground-level, thereby to render it unnecessary for the operator to climb to the top of the apparatus for any purpose, except, perhaps, for changing the filter, which is only required to be done once in every six months.

More specific objects are to provide novel and peculiarly efficacious means for automatically proportioning the chemical solution, as that of the lime employed, to the water under treatment and similarly desirable means for proportioning a chemical solution—such as carbonate of soda $(NA_2CO_3)$—to the water under treatment without requiring dependence to be had on the pump for measuring the solution pumped by it.

Figure 1:
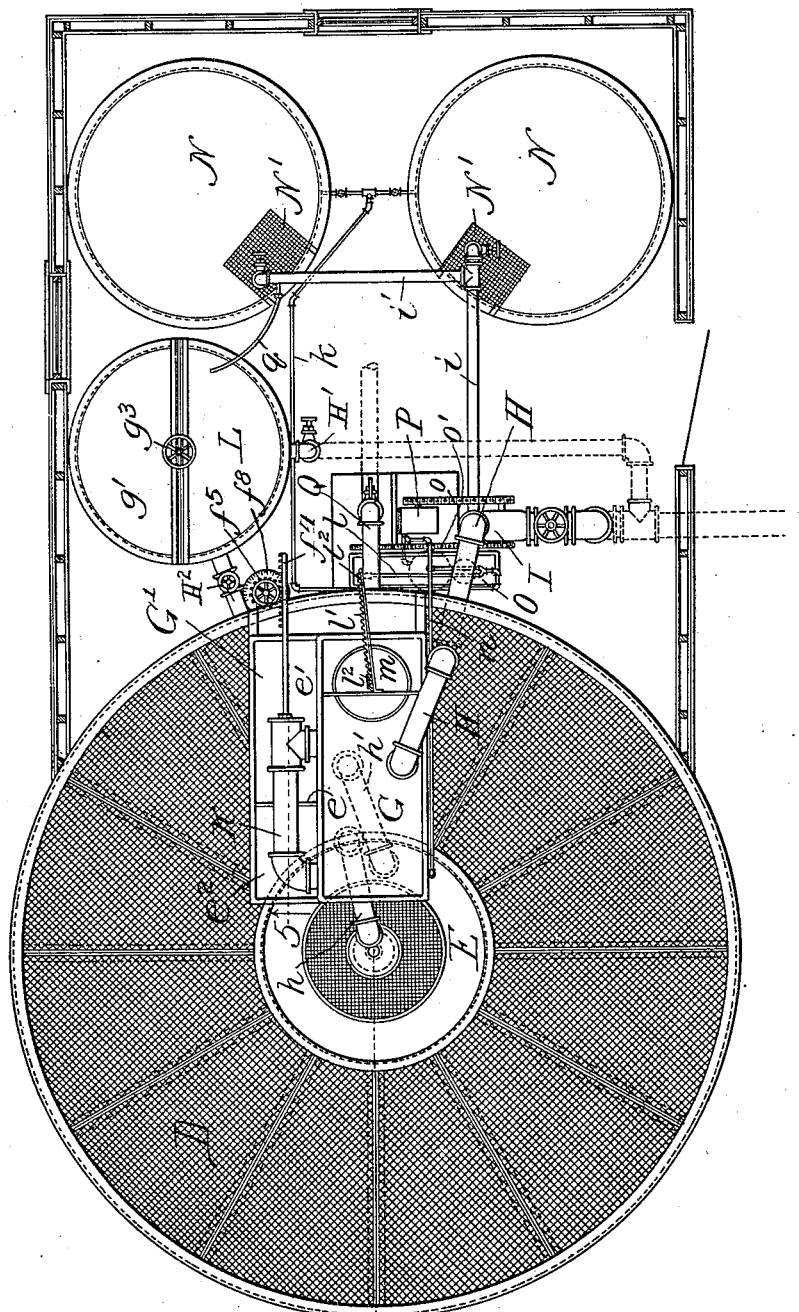
Figure 2:
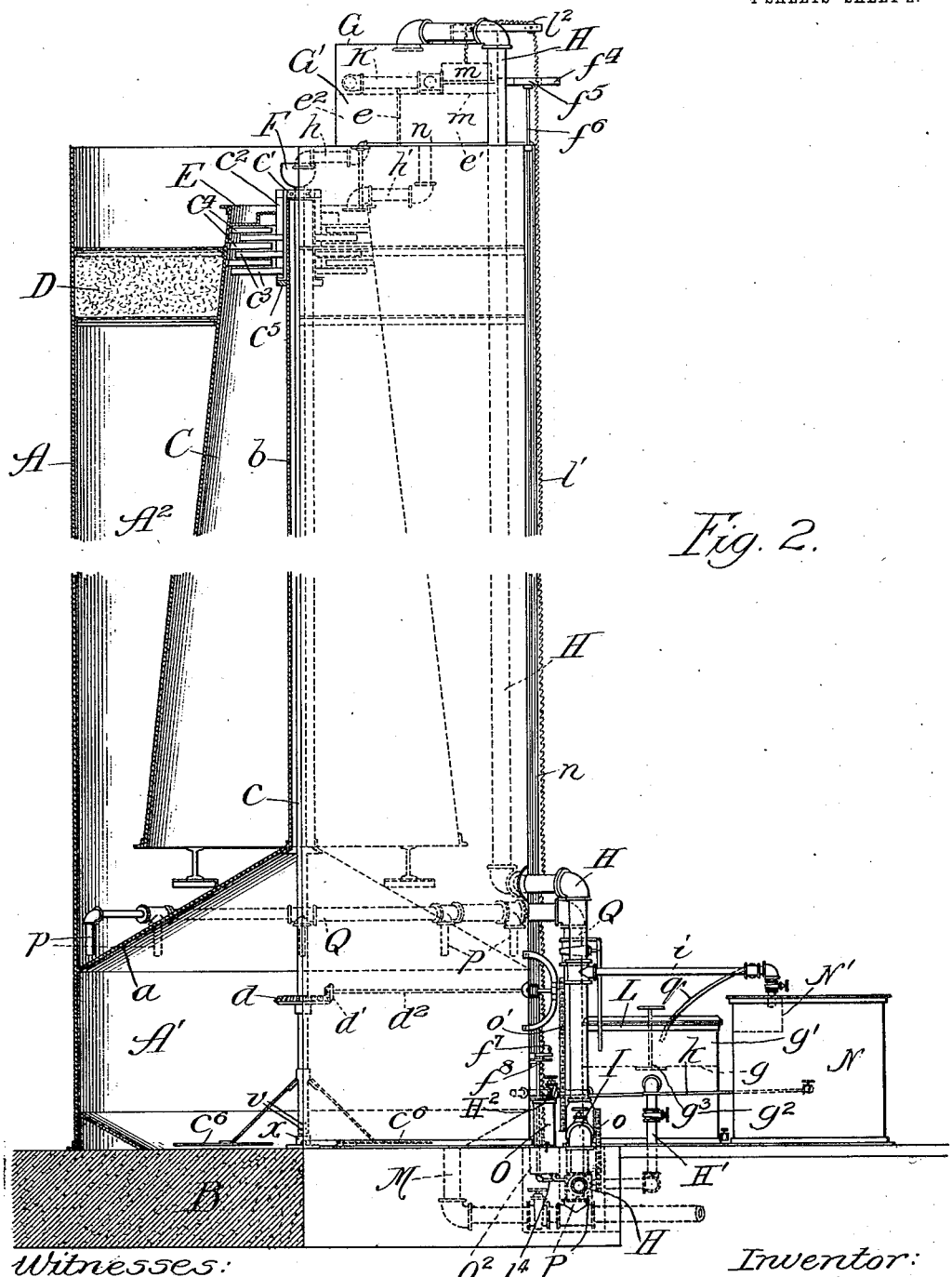

Referring to the accompanying drawings, Figure 1 is a plan view of a water-softening apparatus equipped with my improvements; Fig. 2, a broken view of the same, partly in vertical section and partly in elevation, the section being taken at line 2 on Fig. 1 and regarded in the direction of the arrow and hidden parts being shown by dotted lines; Fig. 3, a broken view in the nature of a diagram representing the mechanism for proportionately supplying the soda solution to the mixing-pan at the upper end of the apparatus; Fig. 4, a broken view, in sectional elevation, of the lower part of the apparatus, showing my improved lime-injector device; Fig. 5, an enlarged broken section taken at the line 5 on Fig. 1 viewed in the direction of the arrow and showing one form of embodiment of my improved means for proportioning the flow of raw water to be treated to the precipitating-tank and to the lime solution, and Fig. 6 a similar view of another form of embodiment of the same.

A is the tank, supported on a suitable foundation, as B, and divided by a cone-shaped partition $a$ into a lower section, forming the lime-saturator $A'$, and an upper section, forming the precipitating-tank $A^2$, of which the partition $a$ forms a conical bottom and in which is supported the downtake-conduit C, that shown flaring downwardly in accordance with my aforesaid patent, though my present invention is not intended to be limited to that peculiarity of the conduit nor its particular location. About the upper portion of the conduit C is shown to be provided in the tank $A^2$ a filter D, and in the upper end of the conduit is contained the mixing-receptacle E, surrounding a stationary vertical tube $b$, which terminates at its lower end in the apex of the cone $a$. A pipe $c$, forming a vertical hollow shaft, is journaled at its lower end, as at $x$, Fig. 2, to extend upwardly centrally through the tube $b$, beyond which it carries a bowl F, this shaft carrying at its upper end beyond the tube a collar $c'$, which has depending from it outside the tube arms $c^2$, carrying horizontally-extending stirrer-blades $c^3$ and rotating against a stationary bearing $c^5$ upon the tube $b$, these blades $c^3$ alternating with stationary blades $c^4$, extending to overlap them from the inner surface of the conduit. Near its lower end in the tank-section $A'$ the shaft $c$ carries stirrer-blades $c^6$ to rotate with it, its rotation being produced through the medium of a bevel-gear $d$ on the shaft meshing with a bevel-pinion $d'$ on a rotary horizontal shaft in the lime-saturator and driven as hereinafter described.

G is the hard-water box, surmounting the tank A above a supplemental box $G'$, shown supported on the tank and extending laterally beyond a side of the box G, the supplemental box being divided by a vertical partition $e$ into two compartments $e'$ and $e^2$. The supply-pipe H for the flow of hard or raw water to be treated includes a water-motor (indicated at I in Fig. 1) to be driven by the pressure of water passing through the pipe for actuating parts hereinafter described, as also the shaft $d^2$, which has a sprocket-and-chain gear connection $o'$ with the motor, as represented. A tube K has an elbow connection at each end with the side presented to view in Fig. 1 of the box G, and thus communicates with that box, and is supported to extend directly over the box G' and across the partition $e$ therein. This tube is provided in its bottom with a longitudinal water-outlet slot $f$ and contains according to the construction represented in Fig. 5 a reciprocable head or piston $f'$, adapted to be set to cover more or less of the slot $f$ at either side of the partition $e$ for proportioning the relative quantities of raw water that enter into the compartments $e'$ and $e^2$. Another of various possible forms of this device for the same purpose, more fully hereinafter explained, is illustrated in Fig. 6, in which the piston is omitted and supplanted by a movable head $f^2$ of triangular shape in cross-section, having its apex at the slot $f$ to direct the discharge of water through the latter to opposite sides of the partition $e$.

The gist of my invention relative to the proportioning device thus described lies in a partition extending edgewise across the course of the flow of water to be treated and a head movable across the partition, between it and the stream, to vary the quantity of water discharged at opposite sides of the partition. I do not, therefore, limit this feature of my improvement to either construction thereof herein shown and described.

For supplying lime to the saturator or chemical-solution holder A', lime is slaked in a suitable tank L adjacent to the saturator containing a horizontal diaphragm $g$, Fig. 4, which divides the tank into an upper slaking compartment or tank $g'$ and a lower compartment or tank $g^2$, communicating through an opening in the diaphragm equipped with a valve device $g^3$. A valved branch H' of the pipe H enters the compartment $g^2$ to discharge therein, as shown, and a valved pipe $H^2$ connects the compartment $g^2$ with the saturator-tank A' and has a leg-section $q^4$ depending in the compartment $g^2$. With the apparatus in use preparatory to introducing slaked lime into the saturator the latter is evacuated of the lime sediment or lime sludge contained in it through a valved conduit M, which may lead to a sewer. This lowers the level of the water in the tube $b$. The lime slaked in the compartment $g'$ is introduced into the compartment $g^2$ by opening the valve $g^3$, and upon closure thereof raw water is introduced through the branch H' into the last-named compartment and forces or injects the slaked lime or solution therein through the pipe $H^2$ (with the valve therein opened) into the saturator A', wherein it is stirred by the stirrers $c^6$. Water for slaking the lime is fed to the compartment $g'$ through a pipe $q$, extending from a branch $i'$.

The lime-water for mixture with the raw water to be treated is made in the saturator by supplying to the latter a suitable proportion of such raw water, and the proportioning is accomplished through the agency of the device represented in Figs. 5 and 6. Thus when it has been ascertained by preliminary test that certain water to be softened requires mixture with it of a certain proportion of lime the head $f'$ (or $f^2$) is adjusted relative to the slot $f$ to direct a suitable proportion of the raw water fed to the apparatus into the saturator for making lime-water of the required quantity. That proportion of the raw water discharges through a pipe $h$, leading from the bottom of the compartment $e^2$, into the bowl F, whence it runs down the hollow shaft $c$ into the saturator A' through openings $v$ in the lower part of the shaft, and the lime-water in the latter rises through the tube $b$ and overflows from its upper end into the mixing-pan E, into which the other proportion of the raw water flows from the compartment $e'$ through a pipe $h'$ to mix with the lime-water and overflow into the conduit C and undergo the operation described in my aforesaid patent. When the adjustable head is once set in the slotted tube K for thus proportioning any particular water, it remains in that condition as long as the character of the water remains the same, being set through the medium of a rack-stem $f^4$, engaged by a pinion $f^5$ on the upper end of a vertical rotatable shaft $f^6$, provided at its lower end with a handle $f^7$ for turning it, the handle being located above a dial-plate $f^8$, Figs. 1 and 2, for properly guiding the operator in setting the proportioning-head relative to the slot $f$ for waters requiring different proportional separations for making the lime-water. If the water to be treated is not subject to change, it is nevertheless desirable to examine the setting mechanism periodically—say once every two weeks—to see that the setting remains proper. To prepare the other chemical solution, as soda-ash, to be used in treating the raw water, duplicate tanks or solution-holders N N are employed for alternate use, containing the usual soda-baskets N' N', into which, respectively, a valved branch $i$ of the water-pipe H and a similarly-valved extension $i'$ of that branch discharge. From each soda-tank a pipe $k$ discharges the soda solution into the tank O' of the lift-pipe device O, which is the same as that set forth in Letters Patent of the United States No. 665,606, granted to me January 8, 1901, the hinged pipe $l$, which is connected by a chain $l'$, passing over guide-pulleys $l^2$ $l^2$, with a float $m$ in the elevated raw-water tank G, for the purpose of maintaining a constant ratio of flow between the raw water in the tank and the solution in the tank O'. The pipe $l$ discharges through the stationary pipe $l^3$ into a sump or box $O^2$, which has a pipe connection $l^4$ with a soda-pump P of any ordinary or suitable variety and which discharges through a pipe n into the mixing-receptacle E. Any other suitable device for proportioning the soda solution than that of the aforesaid lift-pipe variety may be employed without departure from my invention.

With regard to the soda treatment it will be observed that the solution is proportioned entirely by the feed through the lift-pipe l into the sump $O^2$, so that the proper proportion for the raw water is introduced into the latter by the action of the pump P, upon which, therefore, no dependence is required to be had for the measuring. This affords an advantage of great importance, since it is ascertained by practical experience to be the fact that a chemical solution employed for treating raw water in water-purifying apparatus cannot for any considerable continuation of time be measured with required accuracy by means of the pump used to force it to its destination, because the action of the pump does not remain uniform. For actuating the pump P it has a sprocket-and-chain connection o with the motor I.

The pipe shown at Q in Figs. 1 and 2, with branches p in the bottom of the precipitating-tank $A^2$, serves for discharging from the latter in the ordinary manner the sludge upon opening a valve (not shown) in the pipe. By reason of the elevated position of the base of the precipitating-tank, due to providing the chemical-supplying mechanism on the ground-level, the sludge may be readily forced by the hydrostatic pressure in the tank into a vat or car on the same level without requiring the employment of the gooseneck mechanism ordinarily used for the purpose, thereby avoiding the necessity of providing such mechanism.

Lime and soda are the chemicals specified herein as being used for treating the water to be purified and requiring to be supplied thereto in predetermined accurately-measured proportions; but other chemicals may be similarly used in the same apparatus for treating different kinds of water, so that the terms "lime" and "soda" are not intended to restrict the invention in any sense.

What I claim as new, and desire to secure by Letters Patent, is—

1. In a water-purifying apparatus, the combination of a tank divided into a lower lime-saturator and an upper precipitating-tank containing a downtake-conduit, a mixing-receptacle at the upper end of said conduit, a hollow vertical shaft extending through said saturator and conduit, a tube surrounding said shaft in said conduit and opening at its lower end into said saturator and at its upper end into the mixing-receptacle, elevated dividing means for the water to be treated discharging therein, said means discharging into said receptacle and through said shaft into the lime-saturator, and a slaked-lime-injector apparatus adjacent to and discharging into said saturator.

2. In a water-purifying apparatus, the combination of a tank divided into a lower lime-saturator and an upper precipitating-tank containing a downtake-conduit, a mixing-receptacle at the upper end of said conduit, a hollow vertical shaft extending through said saturator and conduit, a tube surrounding said shaft in said conduit and opening at its lower end into said saturator and at its upper end into the mixing-receptacle, elevated dividing means for the water to be treated discharging therein, said means discharging into said receptacle and through said shaft into the lime-saturator, and means adjacent to said saturator for supplying thereto slaked lime, comprising a lower tank and an upper slaking-tank having valved communication with said lower tank, a water-supply pipe discharging into said lower tank and a valved pipe connecting said saturator with and having a leg depending in said lower tank.

3. In a water-purifying apparatus, the combination with a precipitating-tank and a solution-holder communicating therewith, of means for proportioning the supply of flowing water to be treated to said tank and holder, comprising a partition extending across the course of said water, and a head movable across the partition in position to divide the flow to opposite sides thereof.

4. In a water-purifying apparatus, the combination with a precipitating-tank and a solution-holder communicating therewith, of means supported above said tank for proportioning the supply of flowing water to be treated to said tank and holder, comprising a partition extending across the course of said water and a head movable across the partition in position to divide the flow to opposite sides thereof, and means connected with said head for operating and setting it from the base of said tank.

5. In a water-purifying apparatus, the combination with a precipitating-tank, a mixing-receptacle, and a chemical-solution holder communicating with said receptacle, of means for dividing the water to be treated, for the purpose set forth, comprising a slotted conduit into which said water flows, a partition crossing said slot between its ends to divide it into two sections leading, respectively, to said holder and said receptacle, and a head movable along the slot across said partition.

6. In a water-purifying apparatus, the combination with a precipitating-tank, a mixing-receptacle and a chemical-solution holder communicating with said receptacle, of means for dividing the water to be treated, for the purpose set forth, comprising a box into which said water flows, a conduit communicating at its ends with said box and provided between said ends with a slot, a box below said conduit containing a partition crossing said slot between its ends and discharging from one side of the partition into said solution-holder and at the opposite side thereof into said receptacle, and a head movable along the slot across said partition.

7. In a water-purifying apparatus, the combination with a precipitating-tank, a mixing-receptacle and a chemical-solution holder communicating with said receptacle, of means for dividing the water to be treated, for the purpose set forth, comprising a slotted conduit into both ends of which the water to be treated flows and provided between said ends with a slot, a partition crossing said slot to divide it into two sections leading, respectively, to said holder and said receptacle, and a piston in the conduit movable along the slot therein across said partition.

8. In a water-purifying apparatus, the combination of a lime-saturator, a precipitating-tank surmounting said saturator and containing a downtake-conduit, a mixing-receptacle at the upper end of said conduit, a hollow vertical shaft extending through said saturator and conduit and discharging at its lower end into said saturator and at its upper end into the mixing-receptacle, a lower box supported at the upper end of said tank and containing a vertical partition from opposite sides of which it discharges, respectively, into the mixing-receptacle and said shaft, an upper box into which the water to be treated flows, a conduit communicating at its ends with said upper box and containing a slot crossing said partition, a head movable along the slot across said partition and provided with a stem, a vertical rotary shaft geared to said stem for moving the head and provided with a handle for turning it, and a dial adjacent to said handle, for the purpose set forth.

9. In a water-purifying apparatus, the combination with a precipitating-tank, a mixing-receptacle and an elevated receptacle into which the water to be treated flows, of a chemical-solution holder, a tank containing a swinging pipe and a stationary pipe connected therewith, a float in said receptacle connected with said swinging pipe, a sump into which said stationary pipe discharges, a pump communicating at its suction side with said sump, and a pipe leading from the discharge side of the pump into said mixing-receptacle, for the purpose set forth.

CASS L. KENNICOTT.

In presence of—
  L. HEISLAR,
  J. H. LAUDES.